US012027298B2

(12) United States Patent
Yen et al.

(10) Patent No.: US 12,027,298 B2
(45) Date of Patent: Jul. 2, 2024

(54) INDUCTOR DEVICE

(71) Applicant: Realtek Semiconductor Corporation, Hsinchu (TW)

(72) Inventors: Hsiao-Tsung Yen, Hsinchu (TW); Ka-Un Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 748 days.

(21) Appl. No.: 16/829,112

(22) Filed: Mar. 25, 2020

(65) Prior Publication Data

US 2020/0312524 A1 Oct. 1, 2020

Related U.S. Application Data

(60) Provisional application No. 62/871,263, filed on Jul. 8, 2019, provisional application No. 62/826,286, filed on Mar. 29, 2019.

(30) Foreign Application Priority Data

Mar. 3, 2020 (TW) ................................ 109106957

(51) Int. Cl.

*H01F 27/28* (2006.01)
*H01F 17/00* (2006.01)
*H01F 27/29* (2006.01)

(52) U.S. Cl.

CPC ..... *H01F 27/2804* (2013.01); *H01F 17/0013* (2013.01); *H01F 27/2828* (2013.01);
(Continued)

(58) Field of Classification Search

CPC ............ H01F 27/2804; H01F 17/0006; H01F 17/0013; H01F 2027/2809; H01F 5/003;
(Continued)

(56) References Cited

U.S. PATENT DOCUMENTS 5,420,558 A 5/1995 Ito et al.
9,312,060 B2 4/2016 Godoy et al.
(Continued)

FOREIGN PATENT DOCUMENTS

CN 104769687 A 7/2015
CN 108022913 A 5/2018
(Continued)

OTHER PUBLICATIONS

U.S. Appl. No. 16/823,446, filed Mar. 19, 2020.
(Continued)

*Primary Examiner* — Tszfung J Chan

(74) *Attorney, Agent, or Firm* — Locke Lord LLP; Tim Tingkang Xia, Esq.

(57) ABSTRACT

An inductor device includes a first trace, a second trace, a third trace, a fourth trace, and a double ring inductor. The first trace is disposed in a first area, and located on a first layer. The second trace is disposed in the first area, coupled to the first trace, and located on a second layer. The third trace is disposed in a second area, and located on the first layer. The fourth trace is disposed in the second area, coupled to the third trace, and located on the second layer. The double ring inductor is disposed on the first layer, located at outer side of the first trace and the third trace, and coupled to the first trace and the third trace.

8 Claims, 8 Drawing Sheets

(52) U.S. Cl.
CPC ....... *H01F 27/29* (2013.01); *H01F 2017/004* (2013.01); *H01F 2017/0073* (2013.01); *H01F 2027/2809* (2013.01); *H01F 2027/2819* (2013.01)

(58) Field of Classification Search
CPC ..... H01F 2017/0046; H01F 2017/0073; H01F 2017/004; H01F 27/2828; H01F 27/29; H01F 2027/2819; H01F 27/2823
USPC .................................................. 336/200, 232
See application file for complete search history.

(56) References Cited

U.S. PATENT DOCUMENTS

| | | | |
|---|---|---|---|
| 10,186,364 B2 | 1/2019 | Yen et al. | |
| 10,374,571 B2 | 8/2019 | Wang et al. | |
| 2014/0077919 A1* | 3/2014 | Godoy | H01F 27/006 336/226 |
| 2017/0012601 A1* | 1/2017 | Yen | H03H 7/42 |
| 2017/0098500 A1 | 4/2017 | Yen et al. | |
| 2018/0330872 A1 | 11/2018 | Yen et al. | |
| 2019/0148479 A1 | 5/2019 | Yen et al. | |
| 2019/0279809 A1 | 9/2019 | Yen | |
| 2019/0392980 A1 | 12/2019 | Yen | |
| 2020/0234864 A1 | 7/2020 | Elzinga | |

FOREIGN PATENT DOCUMENTS

| | | | |
|---|---|---|---|
| CN | 108962563 A | | 12/2018 |
| JP | 2010154517 A | * | 7/2010 |
| JP | 2010154517 A | | 7/2010 |
| TW | 201428783 A | | 7/2014 |
| TW | 201703070 A | | 1/2017 |
| TW | I643216 B | | 12/2018 |
| TW | I643217 B | | 12/2018 |

OTHER PUBLICATIONS

U.S. Appl. No. 16/823,502, filed Mar. 19, 2020.
U.S. Appl. No. 16/823,557, filed Mar. 19, 2020.
U.S. Appl. No. 16/824,753, filed Mar. 20, 2020.
China Patent Office, Office Action of the corresponding Chinese application No. 201911129792.1 on Mar. 29, 2021.
China Patent Office, Office Action of the related Chinese application No. 202010099915.8 on Mar. 31, 2021.
China Patent Office, Office Action of the related Chinese application No. 202010099595.6 on Mar. 29, 2021.
China Patent Office, Office Action of the related Chinese application No. 202010099604.1 on Mar. 29, 2021.
China Patent Office, Office Action of the corresponding Chinese application No. 202010171503.0 dated Mar. 30, 2021.

* cited by examiner

INDUCTOR DEVICE

RELATED APPLICATIONS

This application claims priority to and the benefit of U.S. Provisional Patent Application No. 62/826,286, filed on Mar. 29, 2019, U.S. Provisional Patent Application No. 62/871,263, filed on Jul. 8, 2019, and Taiwan Application Serial Number 109106957, filed on Mar. 3, 2020, the entire contents of which are incorporated herein by reference as if fully set forth below in its entirety and for all applicable purposes.

BACKGROUND

Field of Invention

The present disclosure relates to an electronic device. More particularly, the present disclosure relates to an inductor device.

Description of Related Art

The various types of inductors according to the prior art have their advantages and disadvantages. For example, a spiral inductor has a higher Q value and a larger mutual inductance. For a spiral inductor, it is hard to avoid coupling generated between the spiral inductor and other devices. For an eight-shaped inductor which has two sets of coils, the coupling between the two sets of coils is relatively low. However, an eight-shaped inductor/transformer occupies a larger area in a device. For a twin inductor/transformer, it is hard to design a symmetric structure, and an application bandwidth of a twin inductor/transformer is relatively narrow. Therefore, the application ranges of the above inductors are all limited.

For the foregoing reasons, there is a need to solve the above-mentioned problems by providing an inductor device.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide an inductor device. The inductor device includes a first trace, a second trace, a third trace, a fourth trace, and a double ring inductor. The first trace is disposed in a first area, and located on a first layer. The second trace is disposed in the first area, coupled to the first trace, and located on a second layer. The third trace is disposed in a second area, and located on the first layer. The fourth trace is disposed in the second area, coupled to the third trace, and located on the second layer. The double ring inductor is disposed on the first layer, located at an outside of the first trace and the third trace, and coupled to the first trace and the third trace.

Therefore, based on the technical content of the present disclosure, the structure of the inductor device is extremely symmetric. Furthermore, the inductor device merely needs a double layer structure, and the inductor device does not need a third layer for connection of the double layer structure. Therefore, the complexity of the circuit design and the area of the inductor device can be reduced. Besides, compared with conventional inductors, the inductor device has higher gain.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Figure 1:
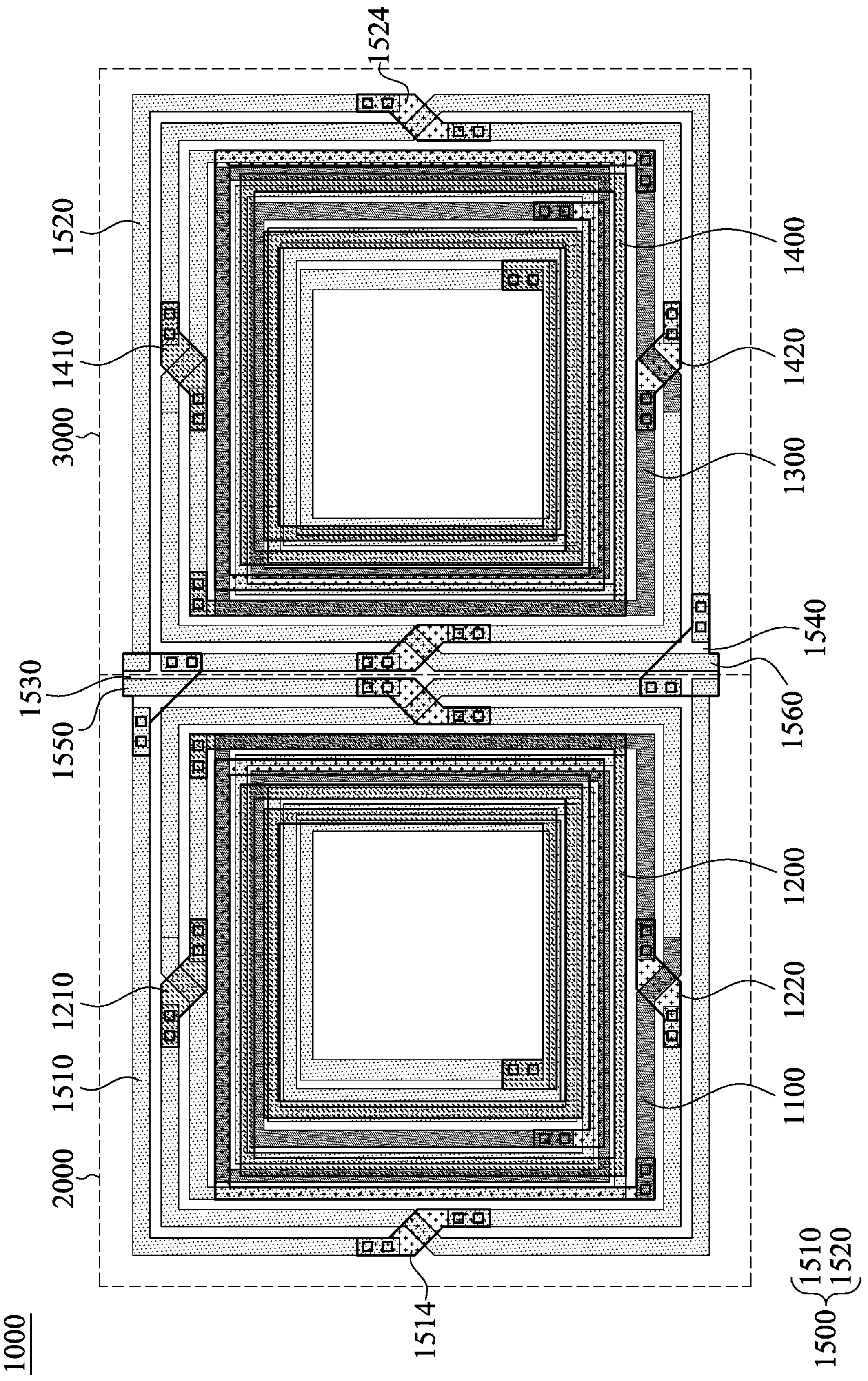
FIG. 1 depicts a schematic diagram of an inductor device according to one embodiment of the present disclosure.

FIG. 1 depicts a schematic diagram of an inductor device according to one embodiment of the present disclosure. As shown in the figure, the inductor device 1000 includes a first trace 1100, a second trace 1200, a third trace 1300, a fourth trace 1400, and a double ring inductor 1500. In some cases, the second trace 1200 and the fourth trace 1400 might be mirrored or duplicated with each other.

With respect to configuration, the first trace 1100 is disposed in a first area 2000, and located on a first layer. The second trace 1200 is disposed in the first area 2000, coupled to the first trace 1100, and located on a second layer. For example, the first trace 1100 and the second trace 1200 are all located in a left area in FIG. 1, and the first trace 1100 and the second trace 1200 are stacked to each other to form a stacked structure. The first trace 1100 is located on a lower layer of the stacked structure, and the second trace 1200 is located on an upper layer of the stacked structure.

In addition, the third trace 1300 is disposed in a second area 3000, and located on the first layer. The fourth trace 1400 is disposed in the second area 3000, coupled to the third trace 1300, and located on the second layer. For example, the third trace 1300 and the fourth trace 1400 are all located in a right area in FIG. 1, and the third trace 1300 and the fourth trace 1400 are stacked to each other to form a stacked structure. The third trace 1300 is located on a lower layer of the stacked structure, and the fourth trace 1400 is located on an upper layer of the stacked structure.

Furthermore, the double ring inductor 1500 is disposed on the first layer, located at an outside of the first trace 1100 and the third trace 1300, and coupled to the first trace 1100 and the third trace 1300. For example, the double ring inductor 1500, the first trace 1100, and the third trace 1300 are disposed on the same layer which is located on the lower layer of the inductor device 1000. The double ring inductor 1500 is independent of the first trace 1100 and the third trace 1300, and located at the outside of the first trace 1100 and the third trace 1300.

In one embodiment, the double ring inductor 1500 includes a fifth trace 1510 and a sixth trace 1520. With respect to configuration, the fifth trace 1510 is disposed in the first area 2000, and coupled to the first trace 1100. The sixth trace 1520 is disposed in the second area 3000, and coupled to the third trace 1300. In addition, the fifth trace 1510 and the sixth trace 1520 are coupled to each other at a junction of the first area 2000 and the second area 3000. For example, the fifth trace 1510 and the sixth trace 1520 are coupled to each other in at least two locations at the junction. Specifically, the fifth trace 1510 and the sixth trace 1520 are coupled to each other at a first side (e.g., an upper side) of the inductor device 1000 through a first connector 1530 of the double ring inductor 1500. In addition, the fifth trace 1510 and the sixth trace 1520 are coupled to each other at a second side (e.g., a lower side) of the inductor device 1000 through a second connector 1540 of the double ring inductor 1500.

In one embodiment, the double ring inductor 1500 further includes a first input/output terminal 1550. The first input/output terminal 1550 is disposed at the fifth trace 1510. As shown in FIG. 1, one terminal of the fifth trace 1510 can be regard as the first input/output terminal 1550. In another embodiment, the first connector 1530 is disposed on the second layer, and crosses the first input/output terminal 1550. As shown in FIG. 1, the first input/output terminal 1550 is located on a lower layer of the inductor device 1000, and the first connector 1530, which is disposed on an upper layer of the inductor device 1000, crosses the first input/output terminal 1550.

In one embodiment, the double ring inductor 1500 further includes a second input/output terminal 1560. The second input/output terminal 1560 is disposed at the sixth trace 1520. As shown in FIG. 1, one terminal of the sixth trace 1520 can be regard as the second input/output terminal 1560. In another embodiment, the second connector 1540 is disposed on the second layer, and crosses the second input/output terminal 1560. As shown in FIG. 1, the second input/output terminal 1560 is located on a lower layer of the inductor device 1000, and the second connector 1540, which is disposed on an upper layer of the inductor device 1000, crosses the second input/output terminal 1560.

Figure 2:
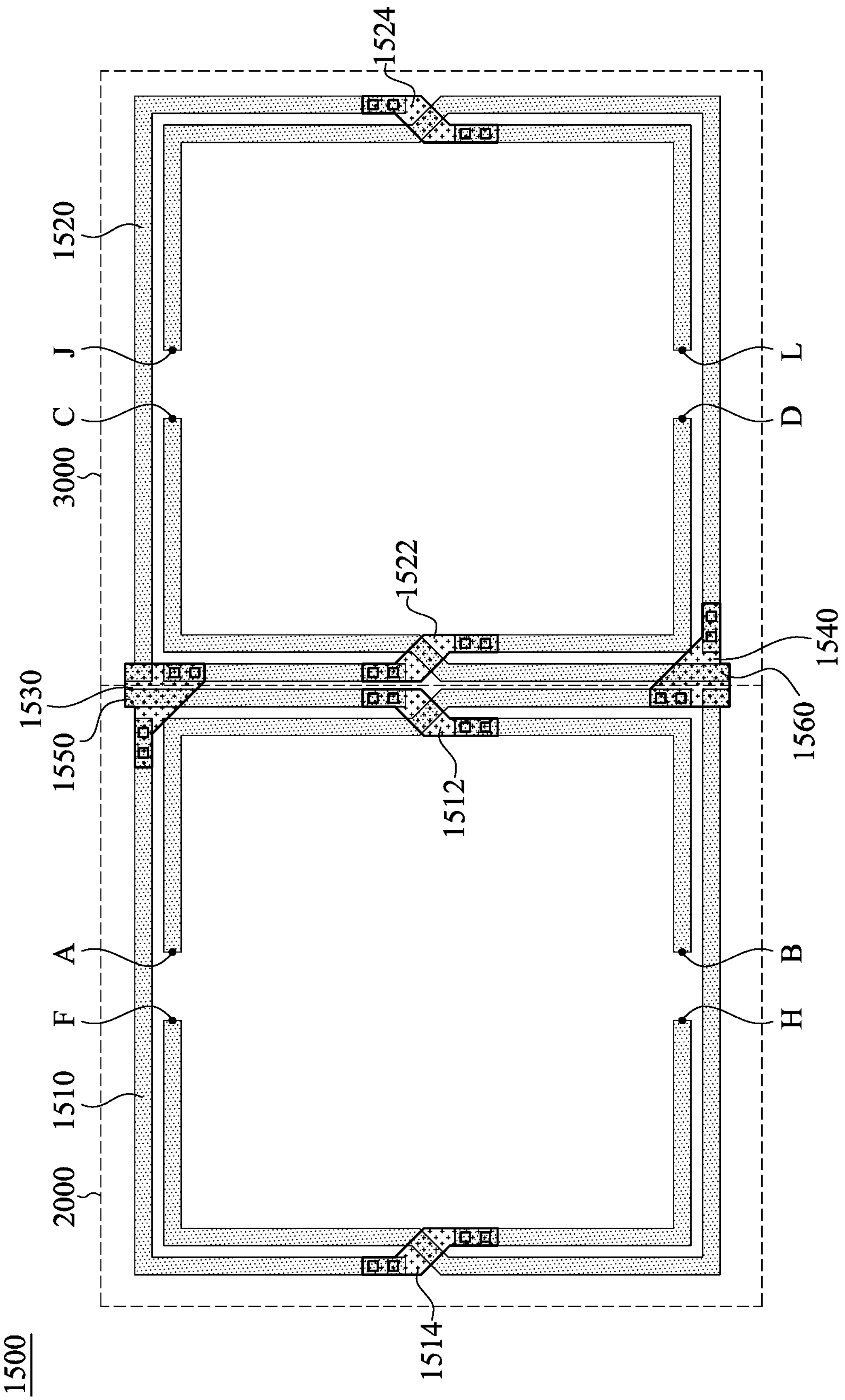
FIG. 2 depicts a schematic diagram of a partial structure of the inductor device shown in FIG. 1 according to one embodiment of the present disclosure.

FIG. 2 depicts a schematic diagram of a partial structure of the inductor device shown in FIG. 1 according to one embodiment of the present disclosure. As shown in the figure, it mainly illustrates the structure of the double ring inductor 1500. The fifth trace 1510 of the double ring inductor 1500 includes a plurality of first sub-wires, and the first sub-wires are coupled to each other at the junction (e.g., the center junction between two wires 1510, 1520) in an interlaced manner. For example, the first sub-wires of the fifth trace 1510 are coupled to each other at the center junction through a connector 1512 in an interlaced manner. In one embodiment, the first sub-wires of the fifth trace 1510 are coupled to each other at a third side which is opposite to the junction in an interlaced manner. For example, the first sub-wires of the fifth trace 1510 are coupled to each other at a left side which is opposite to the center junction through a connector 1514 in an interlaced manner.

In one embodiment, the sixth trace 1520 of the double ring inductor 1500 includes a plurality of second sub-wires. The second sub-wires are coupled to each other at the junction (e.g., the center junction between two wires 1510, 1520) in an interlaced manner. For example, the second sub-wires of the sixth trace 1520 are coupled to each other at the center junction through a connector 1522 in an interlaced manner. In another embodiment, the second sub-wires of the sixth trace 1520 are coupled to each other at a fourth side which is opposite to the junction in an interlaced manner. For example, the second sub-wires of the sixth trace 1520 are coupled to each other at a right side which is opposite to the center junction through a connector 1524 in an interlaced manner.

Figure 3:
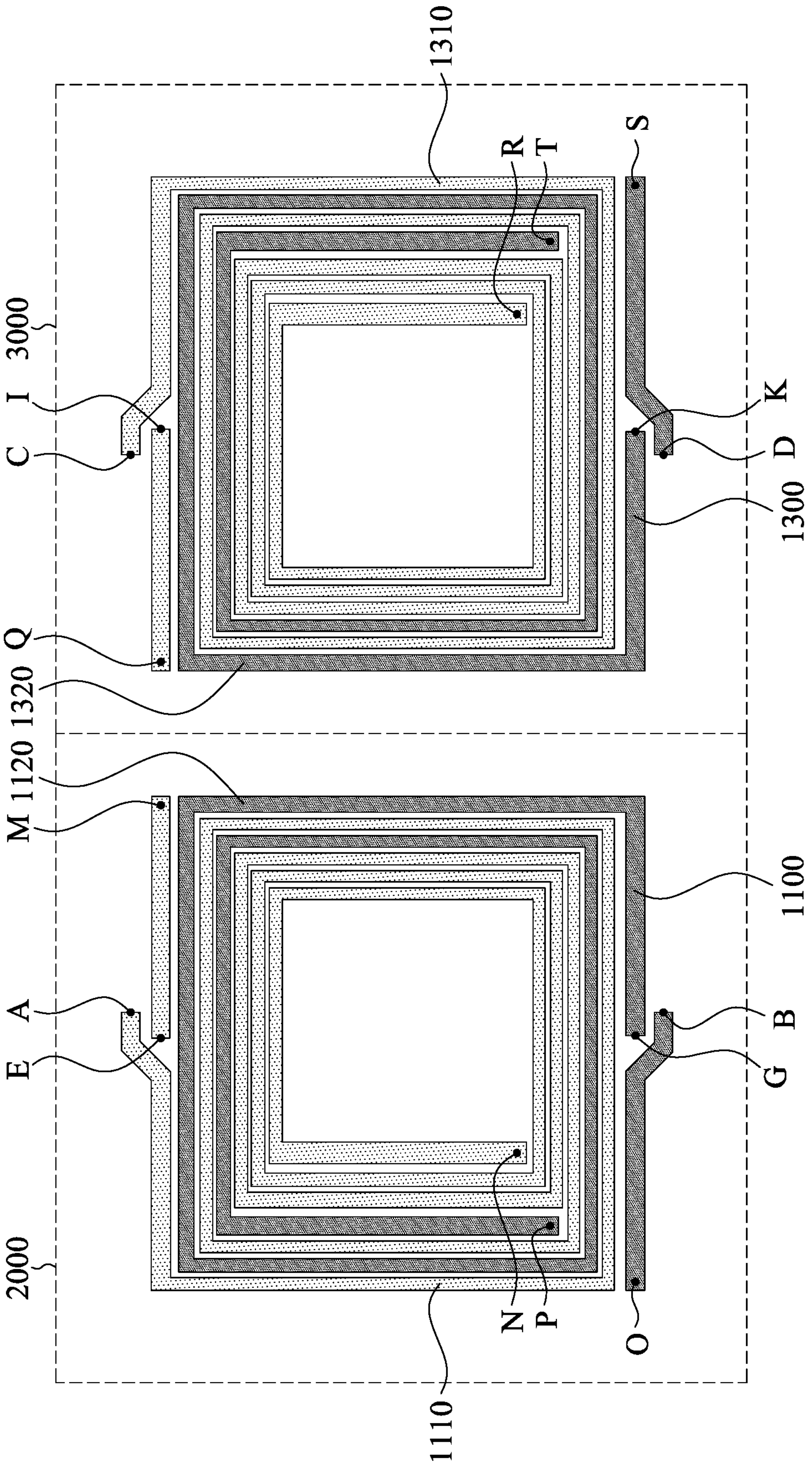
FIG. 3 depicts a schematic diagram of a partial structure of the inductor device shown in FIG. 1 according to one embodiment of the present disclosure.

FIG. 3 depicts a schematic diagram of a partial structure of the inductor device shown in FIG. 1 according to one embodiment of the present disclosure. As shown in the figure, it mainly illustrates the structure of the first trace 1100 and the third trace 1300. For facilitating the understanding of the structure of the inductor device 1000, reference is now made to FIGS. 1-3. The first trace 1100 is respectively coupled to the first sub-wires which are located at an inner side of the first sub-wires of the fifth trace 1510 at the first side and the second side. For example, the first trace 1100 and the first sub-wires which are located at an inner side of the fifth trace 1510 are coupled at a node A at the upper side, and the first trace 1100 and the first sub-wires which are located at an inner side of the fifth trace 1510 are coupled at a node B at the lower side.

In addition, the third trace 1300 is respectively coupled to the second sub-wires which are located at an inner side of the second sub-wires of the sixth trace 1520 at the first side and the second side. For example, the third trace 1300 and the second sub-wires which are located at an inner side of the sixth trace 1520 are coupled at a node C at the upper side, and the third trace 1300 and the second sub-wires which are located at an inner side of the sixth trace 1520 are coupled at a node D at the lower side.

Referring to FIG. 3, the first trace 1100 includes a plurality of sub-wires 1110, 1120, and the third trace 1300 includes a plurality of sub-wires 1310, 1320. As shown in the figured, in the outer part of the first trace 1100, the sub-wires 1110, 1120 are disposed in turn, and the sequence is that "a sub-wire 1110, a sub-wire 1120, a sub-wire 1110, a sub-wire 1120, and so on." In the inner part of the first trace 1100, the sub-wire 1110 forms a plurality of wires by itself. On the other hand, in the outer part of the third trace 1300, the sub-wires 1310, 1320 are disposed in turn, and the sequence is that "a sub-wire 1310, a sub-wire 1320, a sub-wire 1310, a sub-wire 1320, and so on." In the inner part of the third trace 1300, the sub-wire 1310 forms a plurality of wires by itself.

Figure 4:
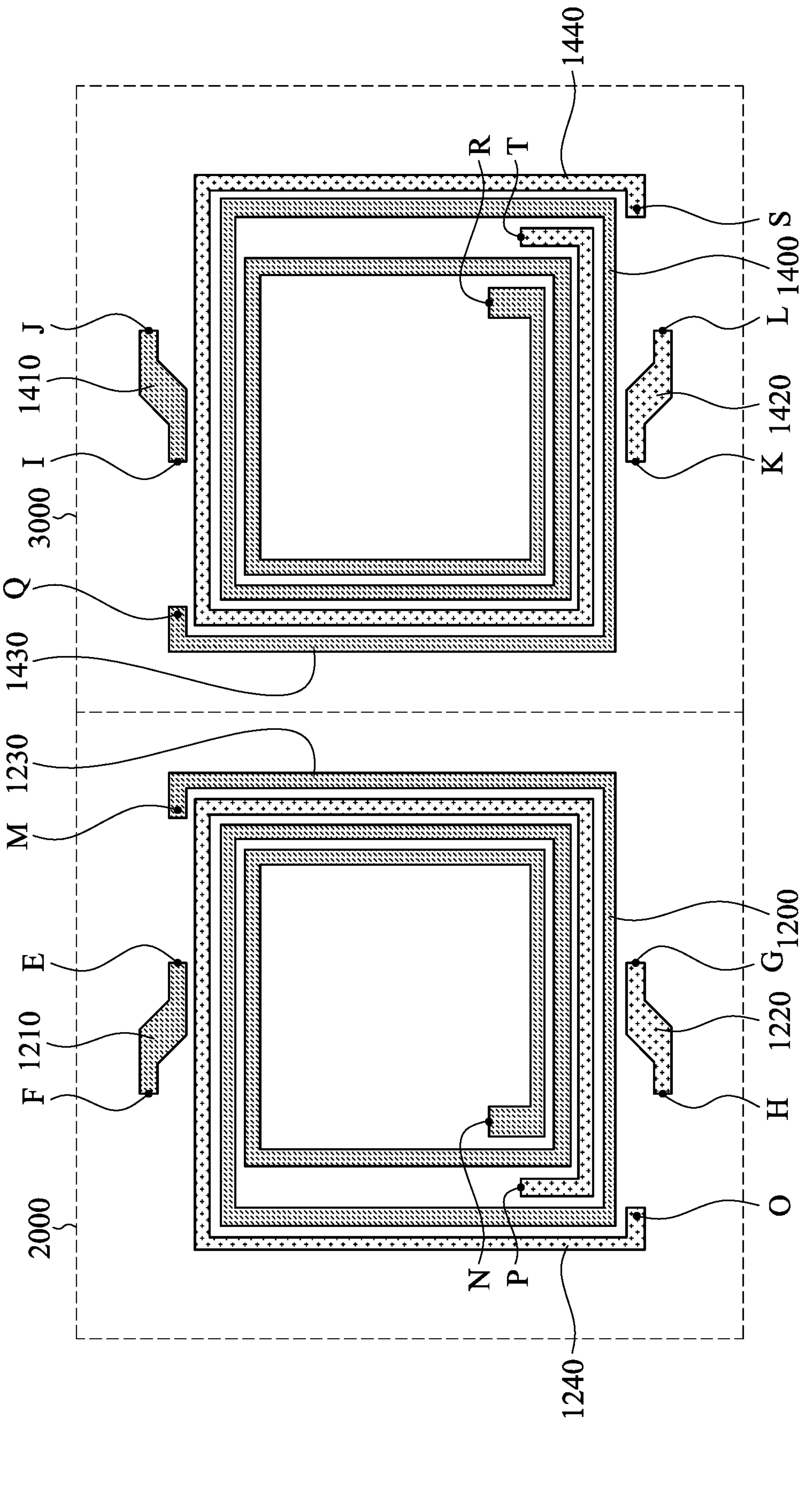
FIG. 4 depicts a schematic diagram of a partial structure of the inductor device shown in FIG. 1 according to one embodiment of the present disclosure.

FIG. 4 depicts a schematic diagram of a partial structure of the inductor device shown in FIG. 1 according to one embodiment of the present disclosure. As shown in FIG. 4, it mainly illustrates the structure of the second trace 1200 and the fourth trace 1400. Reference is now made to FIGS. 1-4, one terminal of the connector 1210 of the second trace 1200 and the first trace 1100 are coupled at a node E at the upper side. In addition, the first trace 1100 is coupled to the first sub-wire which is located in an inner side of the fifth trace 1510 through the connector 1210 at a node F at the upper side. Besides, one terminal of the connector 1220 of the second trace 1200 is coupled to the first trace 1100 at a node G at the lower side. Moreover, the first trace 1100 is coupled to the first sub-wire which is located at an inner side of the fifth trace 1510 through the connector 1220 at a node H at the lower side.

Furthermore, one terminal of the connector 1410 of the fourth trace 1400 is coupled to the third trace 1300 at a node I at the upper side. In addition, the third trace 1300 is coupled to the second sub-wire which is located at an inner side of the sixth trace 1520 through the connector 1410 at a node J at the upper side. Besides, one terminal of the connector 1420 of the fourth trace 1400 is coupled to the third trace 1300 at a node K at the lower side. Moreover, the third trace 1300 is coupled to the second sub-wire which is located at an inner side of the sixth trace 1520 through the connector 1420 at a node L at the lower side.

Referring to FIG. 4, the second trace 1200 includes a plurality of sub-wires 1230, 1240, and the fourth trace 1400 includes a plurality of sub-wires 1430, 1440. As shown in the figure, in the outer part of the second trace 1200, the sub-wires 1230, 1240 are disposed in turn, and the sequence is that "a sub-wire 1230, a sub-wire 1240, and so on." In the inner part of the second trace 1200, the sub-wire 1230 forms a plurality of wires by itself. On the other hand, in the outer part of the fourth trace 1400, the sub-wires 1430, 1440 are disposed in turn, and the sequence is that "a sub-wire 1430, a sub-wire 1440, and so on." In the inner part of the fourth trace 1400, the sub-wire 1430 forms a plurality of wires by itself.

Reference is now made to FIG. 3 and FIG. 4. The sub-wire 1110 of the first trace 1100 and the sub-wire 1230 of the second trace 1200 are coupled at a node M at the upper side. In addition, the sub-wire 1110 of the first trace 1100 is further coupled to the sub-wire 1230 of the second trace 1200 at a node N at the lower side. On the other hand, the sub-wire 1120 of the first trace 1100 is coupled to the sub-wire 1240 of the second trace 1200 at a node O at the lower side. In addition, the sub-wire 1120 of the first trace 1100 is further coupled to the sub-wire 1240 of the second trace 1200 at a node P at the lower side.

Moreover, the sub-wire 1310 of the third trace 1300 and the sub-wire 1430 of the fourth trace 1400 are coupled at a node Q at the upper side. In addition, the sub-wire 1310 of the third trace 1300 is further coupled to the sub-wire 1430 of the fourth trace 1400 at a node R at the lower side. On the other hand, the sub-wire 1320 of the third trace 1300 and the sub-wire 1440 of the fourth trace 1400 are coupled at a node S at a lower side. In addition, the sub-wire 1320 of the third trace 1300 is further coupled to the sub-wire 1440 of the fourth trace 1400 at a node T at the lower side. However, the inductor device 1000 of the embodiment as shown in FIGS. 1-4 is for illustration purpose, and the present disclosure is not intended to be limited thereto.

As shown in FIGS. 1-4, the inductor device 1000 is symmetric on the basis of the junction of the wires 1100, 1200. Therefore, in contrast to conventional inductors, the structure of the inductor device 1000 is extremely symmetric. In addition, the inductor device 1000 of the present disclosure merely needs a double layer structure, and the inductor device 1000 does not need a third layer for connection of the double layer structure. Therefore, the complexity of the circuit design and the area of the inductor device 1000 can be decreased. Besides, compared with conventional inductors, the inductor device 1000 has higher gain. In one embodiment, the wire patterns of the first trace 1100, the second trace 1200, the third trace 1300, and the fourth trace 1400 are not limited to the wire patterns as shown in FIGS. 1-4. As long as the first trace to the fourth trace 1100-1400 may introduce inductance to the inductor device 1000, the first trace to the fourth trace 1100-1400 can be implemented by metal traces, and the shape or the winding manner of the first trace to the fourth trace 1100-1400 is not limited to the embodiment of the present disclosure.

Figure 5:
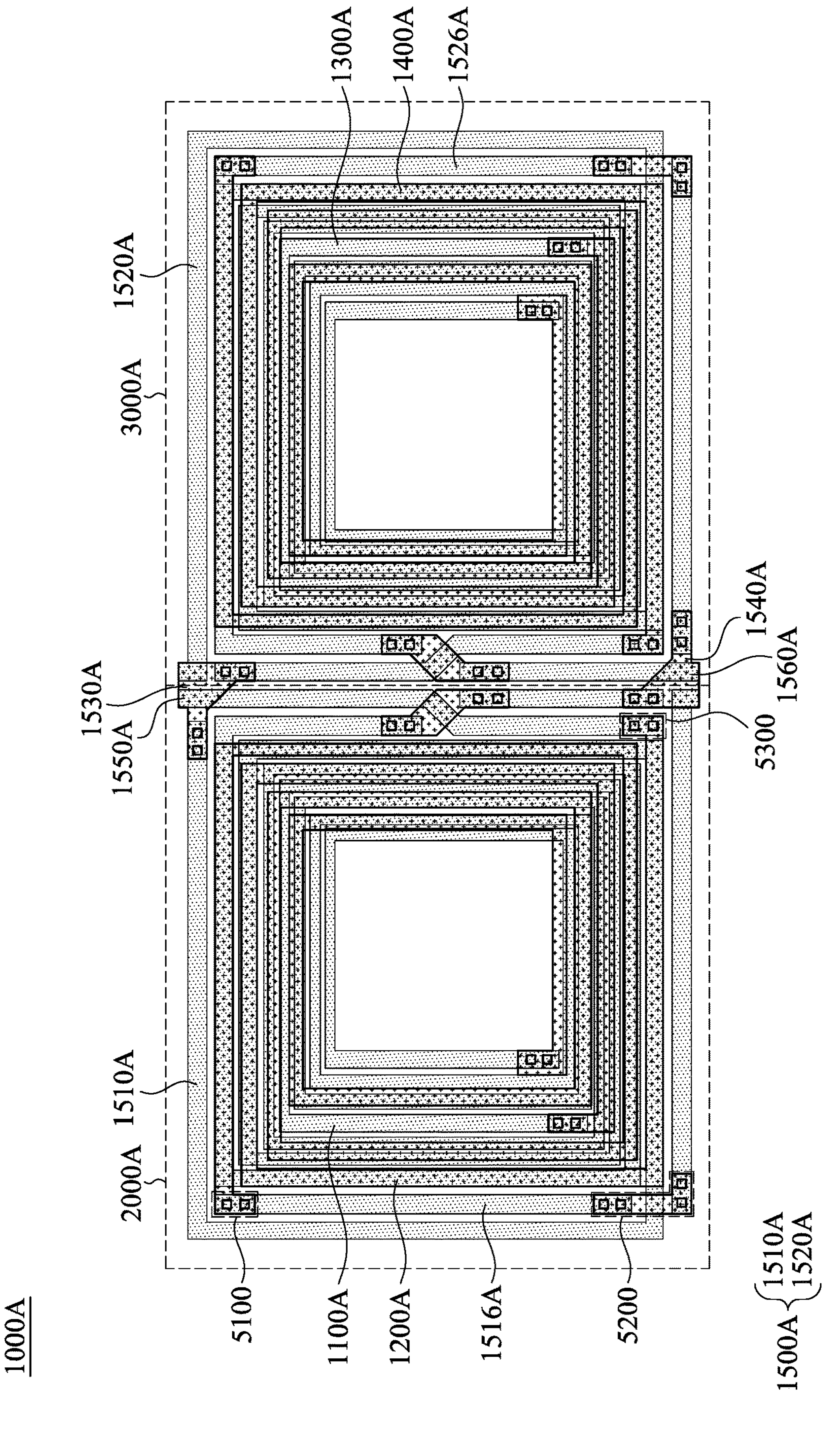
FIG. 5 depicts a schematic diagram of an inductor device according to one embodiment of the present disclosure.

FIG. 5 depicts a schematic diagram of an inductor device according to one embodiment of the present disclosure. Compared with the inductor device 1000 in FIG. 1, the inductor device 1000A in FIG. 5 does not need connectors which are located at the outer side. The above-mentioned connectors are connectors 1210, 1220, 1410, 1420, 1514, 1524 which are located at the outer side of the inductor device 1000 in FIG. 1.

The above-mentioned connectors can be reduced by redesigning the structure of the inductor device 1000A in FIG. 5. For example, reference is now made to the left part of FIG. 1, the connector 1210 can be used to connect the fifth trace 1510 and the first trace 1100, and coupled to the second trace 1200 through the first trace 1100. In other words, the connector 1210 can be used to couple the fifth trace 1510 to the second trace 1200. The inductor device 1000A in the left part of FIG. 5 is redesigning from the inductor device 1000 in FIG. 1 such that the connector 1210 in FIG. 1 is moved to the left side to form the connection 5100 in FIG. 5, and the connection 5100 can also connect the fifth trace 1510A to the second trace 1200A.

Referring to left part of FIG. 1, the connector 1514 can be used to connect two first sub-wires of the fifth trace 1510. The inductor device 1000A in the left part of FIG. 5 is redesigning from the inductor device 1000 in FIG. 1 such that the connector 1514 in FIG. 1 is moved down to form the connection 5200 in FIG. 5, and the connection 5200 can also connect two first sub-wires of the fifth trace 1510A. In addition, the inductor device 1000A in FIG. 5 is redesigning from the inductor device 1000 in FIG. 1 to move the connector 1220 in FIG. 1 to the right to form the connection 5300 in FIG. 5, and the connection 5300 can connect the fifth trace 1510A to the second trace 1200A.

It is noted that, since the right part of the structure in FIG. 5 and the left part of the structure in FIG. 5 are symmetric, the right part of the structure in FIG. 5 can be redesigned according to the above-mentioned redesign manner of the left part of the structure in FIG. 5. As such, the connectors 1410, 1420, 1524 in the right part of the structure in FIG. 1 can be reduced. In one embodiment, owing to the above-mentioned redesign manner, the second trace 1200A and the fifth trace 1510A are partially overlapped with each other in the upper side and the lower side, and the fourth trace 1400A and the sixth trace 1520A are partially overlapped with each other in the upper side and the lower side. However, the inductor device 1000A of the embodiment as shown in FIG. 5 is for illustration purpose, and the present disclosure is not intended to be limited thereto.

Since the above-mentioned connectors can be removed from the inductor device 1000A in FIG. 5, the cost of the inductor device 1000A can be reduced, and the area and the complexity of the circuit design of the inductor device 1000A can be decreased. Furthermore, the quality factor (Q) of the inductor device 1000A can be enhanced.

Figure 6:
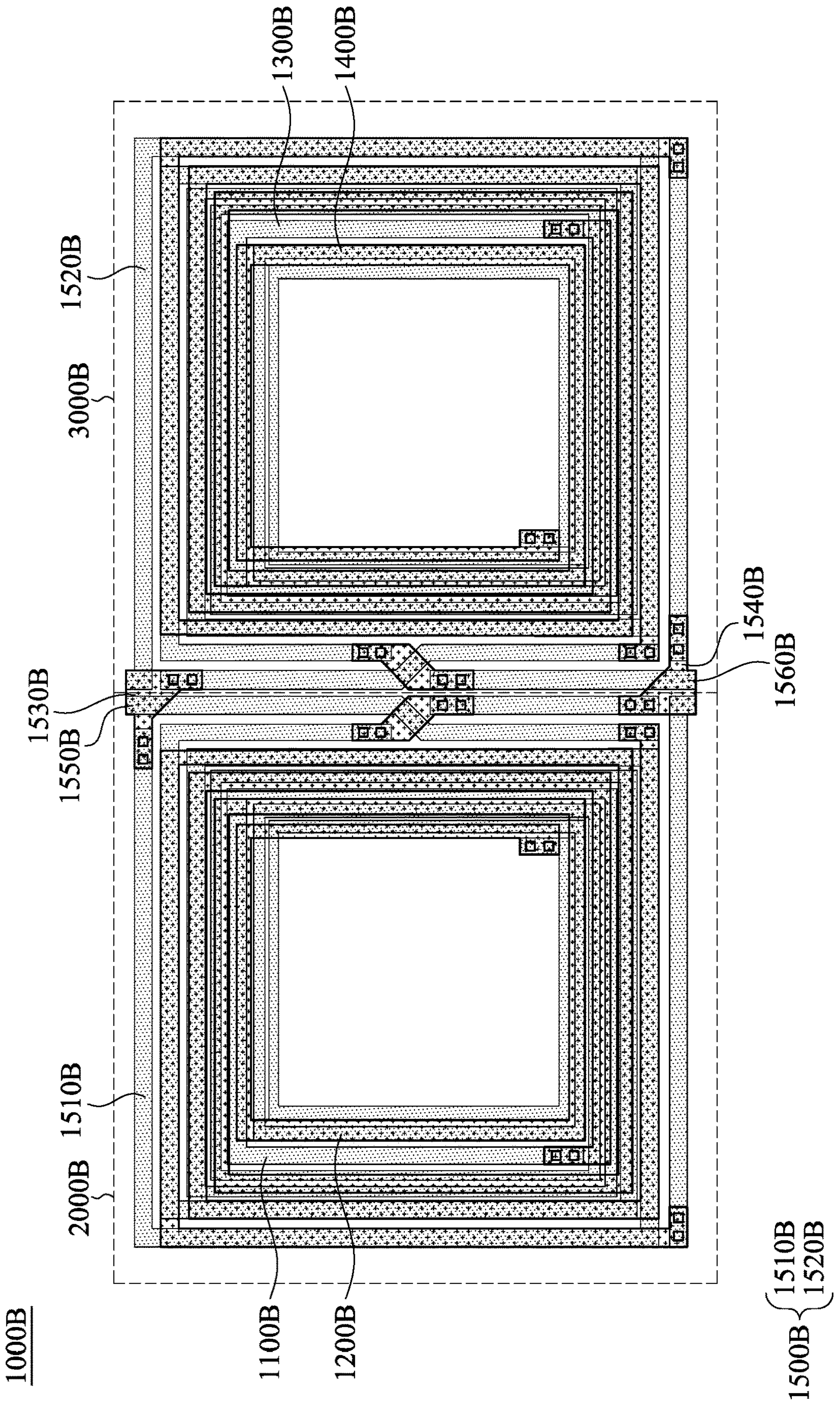
FIG. 6 depicts a schematic diagram of an inductor device according to one embodiment of the present disclosure.

FIG. 6 depicts a schematic diagram of an inductor device according to one embodiment of the present disclosure. Compared with the inductor device 1000A in FIG. 5, the inductor device 1000B in FIG. 6 does not need a portion trace 1516A of the fifth trace 1510A of the inductor device 1000A in FIG. 5. Therefore, the second trace 1200A which is located at the second layer can be coupled together (e.g., the second trace 1200A extends downward from the connection 5100 to couple with the connection 5200). Since the second trace 1200A which is located at the second layer has been coupled together, the wire of the second trace 1200A which is located at the second layer can be moved to the left, and the moved wire of the second trace 1200A is above the fifth trace 1510A which is located at the first layer. The structure which has been rearranged (e.g., part of the structure has been moved to the left) is as shown in FIG. 6. It can be seen from FIG. 6 that the second trace 1200B has been moved above the fifth trace 1510B, and the second trace 1200B and the fifth trace 1510B are overlapped to each other at the left side which is opposite to the center junction.

It is noted that, since the right part of the structure in FIG. 6 and the left part of the structure in FIG. 6 are symmetric, the right part of the structure in FIG. 6 can be redesigned according to the above-mentioned redesign manner of the left part of the structure in FIG. 6. As such, a portion trace 1526A of the sixth trace 1520A in FIG. 5 can be reduced. The wire of the fourth trace 1400A which is located at the second layer in FIG. 5 can be moved to the right, and the moved wire of the fourth trace 1400A is above the sixth trace 1520A which is located at the first layer. It can be seen from FIG. 6 that the fourth trace 1400B has been moved above the sixth trace 1520B, and the fourth trace 1400B and the sixth trace 1520B are overlapped to each other at the right side which is opposite to the center junction. However, the inductor device 1000B of the embodiment as shown in FIG. 6 is for illustration purpose, and the present disclosure is not intended to be limited thereto.

As can be seen above, the structure in the first layer and the structure in the second layer in the inductor device 10008 of FIG. 6 can be stacked to each other by the above-mentioned redesign manner. Since the stacked area of the first layer and the second layer increases, the planar area and the complexity of the circuit design of the inductor device 1000E is decreased. Furthermore, the quality factor (Q) of the inductor device 10008 can be enhanced.

Figure 7A:
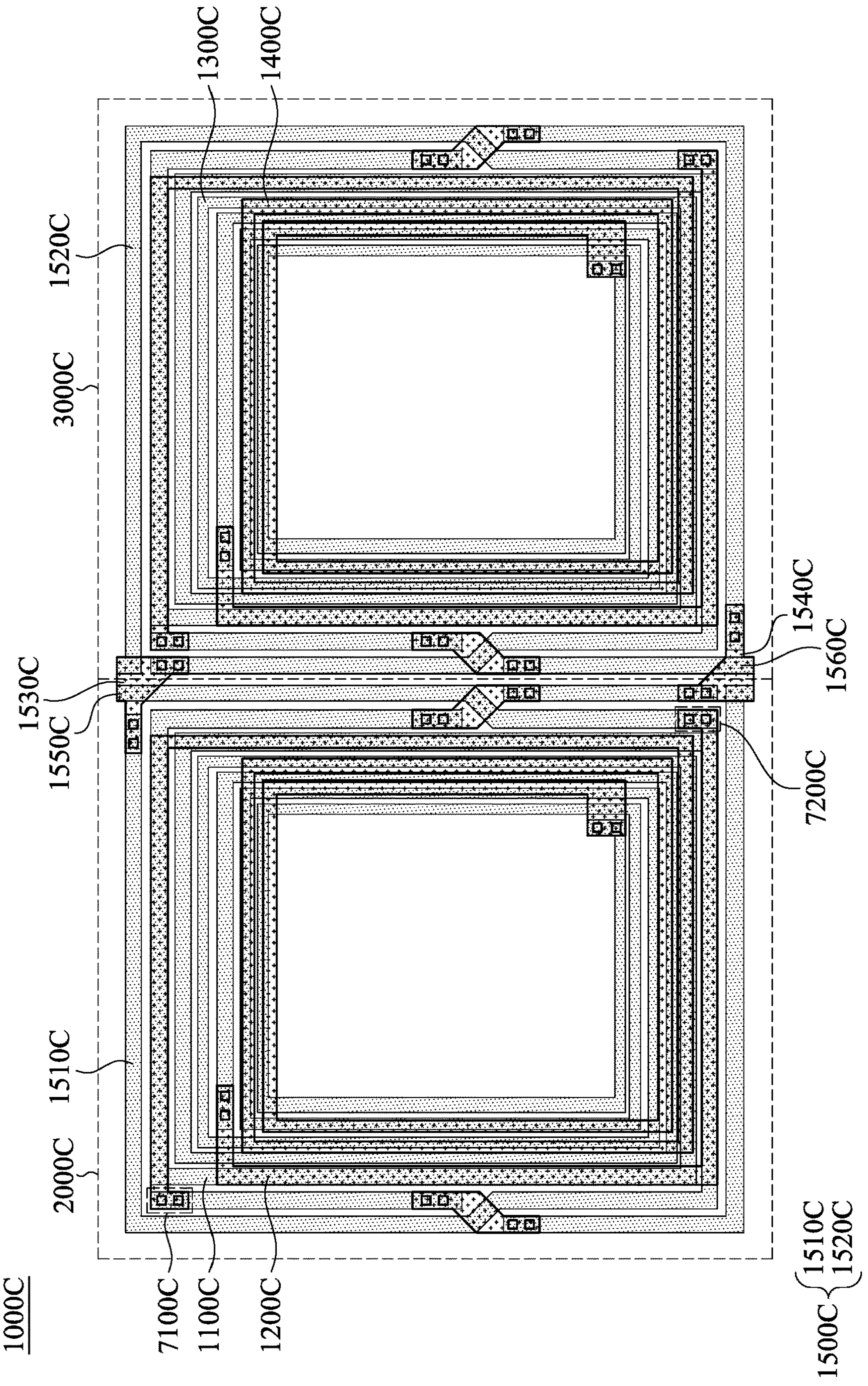
FIG. 7A depicts a schematic diagram of an inductor device according to one embodiment of the present disclosure.

FIG. 7A depicts a schematic diagram of an inductor device according to one embodiment of the present disclosure. Compared with the inductor device 1000 in FIG. 1, the inductor device 1000C in FIG. 7A does not need part of the connectors which are located at the outer side. The part of the connectors are connectors 1210, 1220, 1410, 1420 which are located at the outer side of the inductor device 1000 in FIG. 1.

The part of the connectors can be reduced by redesigning the structure of the inductor device 1000C in FIG. 7A. For example, reference is now made to the left part of FIG. 1, the connector 1210 can be used to connect the fifth trace 1510 and the first trace 1100, and coupled to the second trace 1200 through the first trace 1100. In other words, the connector 1210 can be used to couple the fifth trace 1510 to the second trace 1200. The inductor device 1000C in the left part of FIG. 7A is redesigning from the inductor device 1000 in FIG. 1 such that the connector 1210 in FIG. 1 is moved to the left side to form the connection 7100C in FIG. 7A, and the connection 7100C can also connect the fifth trace 1510C to the second trace 1200C. In addition, the inductor device 1000C in the left part of FIG. 7A is redesigning from the inductor device 1000 in FIG. 1 such that the connector 1220 in FIG. 1 is moved to the right side to form the connection 7200C in FIG. 7A, and the connection 7200C can connect the fifth trace 1510C to the second trace 1200C.

It is noted that, since the right part of the structure in FIG. 7A and the left part of the structure in FIG. 7A are symmetric, the right part of the structure in FIG. 7A can be redesigned according to the above-mentioned redesign manner of the left part of the structure in FIG. 7A. As such, the connectors 1410, 1420 in the right part of the structure in FIG. 1 can be reduced. In one embodiment, owing to the above-mentioned redesign manner, the first trace 1100C and the second trace 1200C are partially overlapped with each other, and the third trace 1300C and the fourth trace 1400C are partially overlapped with each other. However, the inductor device 1000C of the embodiment as shown in FIG. 7A is for illustration purpose, and the present disclosure is not intended to be limited thereto.

Since the above-mentioned connectors can be removed from the inductor device 1000C in FIG. 7A, the cost of the inductor device 1000C can be reduced, and the area and the complexity of the circuit design of the inductor device 1000C can be decreased. Furthermore, the quality factor (Q) of the inductor device 1000C can be enhanced.

Figure 7B:
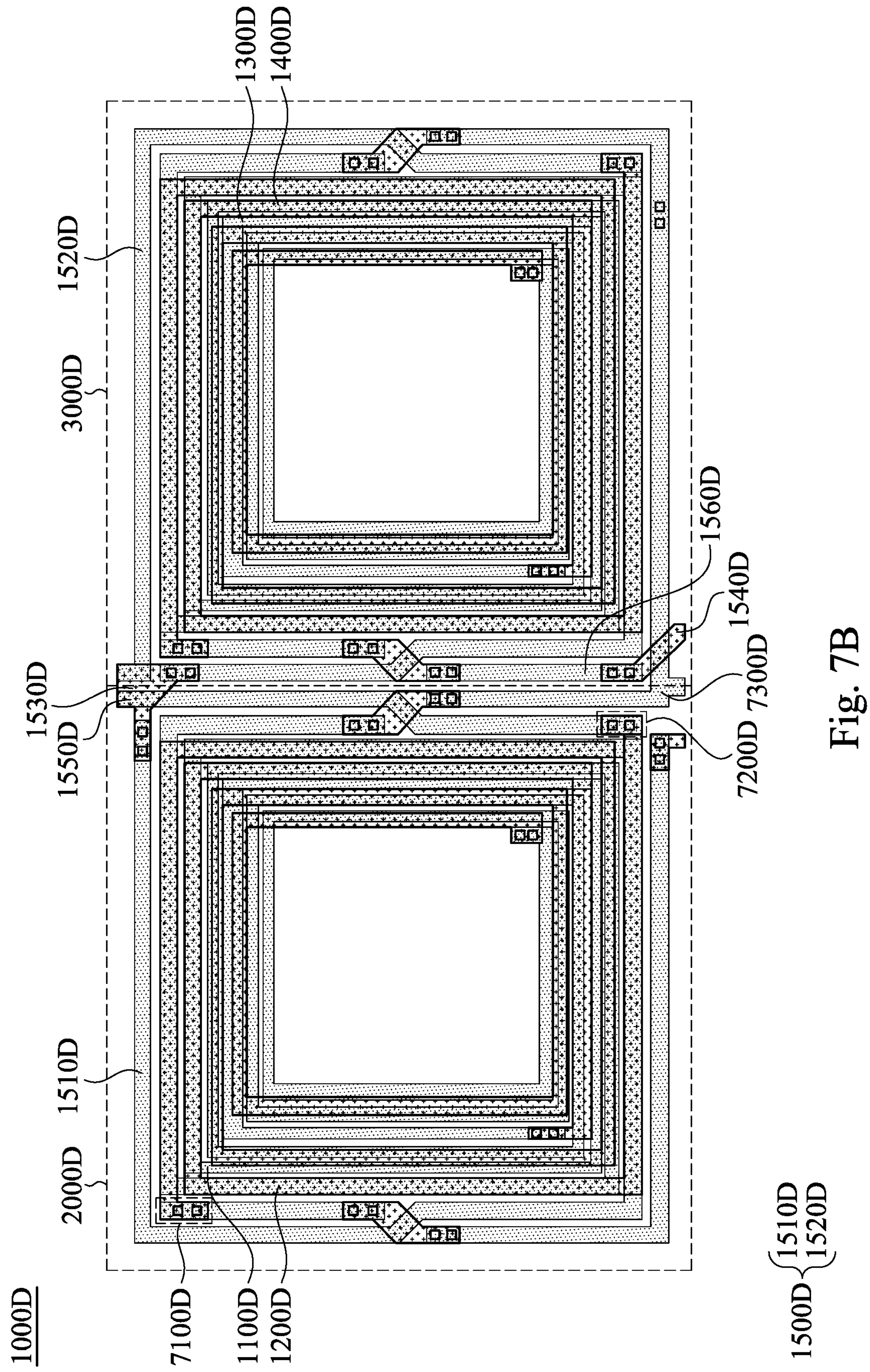
FIG. 7B depicts a schematic diagram of an inductor device according to one embodiment of the present disclosure.

FIG. 7B depicts a schematic diagram of an inductor device according to one embodiment of the present disclosure. Compared with the inductor device 1000 in FIG. 1, the inductor device 1000D in FIG. 7B does not need part of the connectors which are located at the outer side. The part of the connectors are connectors 1210, 1220, 1410, 1420 which are located at the outer side of the inductor device 1000 in FIG. 1. In addition, part of the connection of the inductor device 1000D in FIG. 7B is different, for example, the second connector 1540D of the inductor device 1000D in FIG. 7B is different from the second connector 1540 of the inductor device 1000 in FIG. 1.

The connectors 1210, 1220, 1410, 1420 which are located at the outer side of the inductor device 1000 can be reduced by redesigning its structure to form the inductor device 1000D in FIG. 7B. The redesign manner has been described in the embodiment of FIG. 7A, and a detailed description regarding the redesign manner will be omitted herein for the sake of brevity.

Furthermore, the connection of the second connector 1540D of the inductor device 1000D in FIG. 7B is different. In the inductor device 1000 shown in FIG. 1, the fifth trace 1510 and the sixth trace 1520 are coupled to each other through the second connector 1540 of the double ring inductor 1500 in the second side (e.g., the lower side) of the inductor device 1000, and the second connector 1540 crosses the second input/output terminal 1560. In the inductor device 1000D shown in FIG. 7B, the second connector 1540D is used to extend the second input/output terminal 1560D to the outside of the inductor device 1000D, and the fifth trace 1510D and the sixth trace 1520D are coupled to each other through a connection 7300D of the double ring inductor 1500D at the second side (e.g., the lower side) of the inductor device 1000D. However, the inductor device 1000D of the embodiment as shown in FIG. 7B is for illustration purpose, and the present disclosure is not intended to be limited thereto.

Since the above-mentioned connectors can be removed from the inductor device 1000D in FIG. 7B, the cost of the inductor device 1000D can be reduced, and the area and the complexity of the circuit design of the inductor device 1000D can be decreased. Furthermore, the quality factor (0) of the inductor device 1000D can be enhanced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:

a first trace disposed in a first area, and located on a first layer;

a second trace disposed in the first area, coupled to the first trace, and located on a second layer;

a third trace disposed in a second area, and located on the first layer;

a fourth trace disposed in the second area, coupled to the third trace, and located on the second layer; and a double ring inductor having at least one input/output terminal disposed on the first layer, located at an outside of the first trace and the third trace, and coupled to the first trace and the third trace, wherein the double ring inductor further comprises:

a fifth trace disposed in the first area, and the fifth trace being coupled to the first trace;

a sixth trace disposed in the second area, and the sixth trace being coupled to the third trace, wherein the fifth trace and the sixth trace are coupled to each other at a junction of the first area and the second area, the fifth trace and the sixth trace are coupled to each other in at least two locations at the junction; and at least one connector, wherein the sixth trace is coupled to the fifth trace through the at least one connector, wherein the at least one connector is disposed on the second layer and crosses over the at least one input/output terminal disposed on the first layer, wherein the at least one connector further comprises:

a first connector coupled to the fifth trace and the sixth trace at a first side of the inductor device;

a second connector coupled to the fifth trace and the sixth trace at a second side of the inductor device;

a first input/output terminal disposed at the fifth trace; and a second input/output terminal disposed at the sixth trace, wherein the first connector is disposed on the second layer, and crosses the first input/output terminal, and wherein the second connector is disposed on the second layer, and crosses the second input/output terminal.

2. The inductor device of claim 1, wherein the fifth trace comprises a plurality of first sub-wires, and the first sub-wires are coupled to each other at the junction in an interlaced manner.

3. The inductor device of claim 2, wherein the sixth trace comprises a plurality of second sub-wires, and the second sub-wires are coupled to each other at the junction in an interlaced manner.

4. The inductor device of claim 3, wherein the first trace and the second trace are partially overlapped with each other, and the third trace and the fourth trace are partially overlapped with each other.

5. An inductor device, comprising:

a first trace disposed in a first area, and located on a first layer;

a second trace disposed in the first area, coupled to the first trace, and located on a second layer;

a third trace disposed in a second area, and located on the first layer;

a fourth trace disposed in the second area, coupled to the third trace, and located on the second layer; and a double ring inductor having at least one input/output terminal disposed on the first layer, located at an outside of the first trace and the third trace, and coupled to the first trace and the third trace, wherein the double ring inductor further comprises:

a fifth trace disposed in the first area, and the fifth trace being coupled to the first trace:

a sixth trace disposed in the second area, and the sixth trace being coupled to the third trace, wherein the fifth trace and the sixth trace are coupled to each other at a junction of the first area and the second area, the fifth trace and the sixth trace are coupled to each other in at least two locations at the junction; and at least one connector, wherein the sixth trace is coupled to the fifth trace through the at least one connector, wherein the at least one connector is disposed on the second layer and crosses over the at least one input/output terminal disposed on the first layer, wherein the at least one connector further comprises:

a first connector coupled to the fifth trace and the sixth trace at a first side of the inductor device; and a second connector coupled to the fifth trace and the sixth trace at a second side of the inductor device;

wherein the fifth trace comprises a plurality of first sub-wires, and the first sub-wires are coupled to each other at the junction in an interlaced manner, wherein the sixth trace comprises a plurality of second sub-wires, and the second sub-wires are coupled to each other at the junction in an interlaced manner, and wherein the first sub-wires are coupled to each other at a third side which is opposite to the junction in an interlaced manner.

6. The inductor device of claim 5, wherein the second sub-wires are coupled to each other at a fourth side which is opposite to the junction in an interlaced manner.

7. The inductor device of claim 6, wherein the first trace comprises at least one wire, and the first trace is respectively coupled to the first sub-wires which are located at an inner side of the first sub-wires at the first side and the second side.

8. The inductor device of claim 7, wherein the third trace comprises at least one wire, and the third trace is respectively coupled to the second sub-wires which are located at an inner side of the second sub-wires at the first side and the second side.

* * * * *